United States Patent [19]

Kohn et al.

[11] 4,273,898

[45] Jun. 16, 1981

[54] BLOCK COPOLYMER OF POLYETHERAMIDE AND RANDOM COPOLYMER OF POLYAMIDE AND POLYETHERAMIDE

[75] Inventors: Edward M. Kohn, Philadelphia, Pa.; Stephen L. Nickol; Robert M. Thompson, both of Wilmington, Del.

[73] Assignee: Suntech, Inc., Philadelphia, Pa.

[21] Appl. No.: 73,331

[22] Filed: Sep. 6, 1979

[51] Int. Cl.³ .................... C08L 77/00; C08G 69/40
[52] U.S. Cl. .................... 525/432; 528/324; 528/335
[58] Field of Search ........................ 525/432

[56] References Cited

U.S. PATENT DOCUMENTS

| | | | |
|---|---|---|---|
| 3,397,107 | 8/1968 | Kimura | 528/336 |
| 3,509,106 | 4/1970 | Lotz | 260/78 |
| 3,729,449 | 4/1973 | Kimura | 528/336 |
| 3,843,609 | 10/1974 | Kimura | 528/336 |
| 4,044,071 | 8/1977 | Nickol | 525/432 |
| 4,045,511 | 8/1977 | Nickol | 525/432 |
| 4,113,794 | 9/1978 | Thompson | 525/432 |
| 4,130,602 | 12/1978 | Thompson | 525/432 |
| 4,136,133 | 1/1979 | Thompson | 525/432 |
| 4,165,346 | 8/1979 | Thompson | 525/432 |
| 4,168,602 | 9/1979 | Thompson | 525/432 |
| 4,177,222 | 12/1979 | Thompson | 525/432 |

FOREIGN PATENT DOCUMENTS 1150725  4/1969  United Kingdom .................... 525/432

*Primary Examiner*—Paul Lieberman
*Attorney, Agent, or Firm*—J. Edward Hess; Donald R. Johnson; Anthony Potts, Jr.

[57] ABSTRACT

A novel composition comprises a block copolymer of a polyetheramide, e.g., poly-(4,7-dioxadecamethylene adipamide) and a random copolymer resulting from the polymerization of an ether free polyamide precursor, e.g., hexamethylenediamine salt of adipic acid and a precursor of a polyetheramide. The block copolymer can be more easily processed into useful articles such as fiber and film because it differs structurally from a corresponding block copolymer of homopolymers of polyetheramide and polyamide.

3 Claims, No Drawings

BLOCK COPOLYMER OF POLYETHERAMIDE AND RANDOM COPOLYMER OF POLYAMIDE AND POLYETHERAMIDE

BACKGROUND OF THE INVENTION

This invention is directed to a composition of matter. In general the composition is a polyamide copolymer. One of the two components of the copolymer is a polyetheramide e.g., a poly(dioxa-alkylamide), a poly(dioxa-arylamide), or a poly(oxa-amide). The other component is a random copolymer which can result from, but is not limited to, the polycondensation of a precursor of the aforementioned polyetheramide, and a precursor of an ether-free polyamide. In particular the invention is directed to a block copolymer consisting of the two aforementioned components. The block copolymer has utility, as, for example, a fiber. A preferred composition is one wherein the random copolymer is formed, in part from a precursor of a polyamide which is considered to be difficult to form a block copolymer because its transamidation rate at a temperature above its melting point is relatively rapid; an example is nylon 6,6. A rapid transamidation rate can be a disadvantage in two processing steps, one, when the block copolymer is formed and, two, when the block copolymer is melt spun into a fiber.

U.S. Pat. No. 4,130,602 discloses a block copolymer of a poly(dioxa-alkylamide) and a polyamide. U.S. Application Ser. No. 773,740, filed Mar. 2, 1977 discloses a block copolymer of a poly(dioxa-arylamide) and a polyamide. U.S. Pat. No. 4,136,133 discloses a block copolymer of poly(oxa-amide) and a polyamide. U.S. Pat. No. 4,113,794 discloses a copolymer of blocks of a random poly(dioxa-amide) and a polyamide. U.S. Pat. No. 4,045,511 discloses a process for melt blending particles of a melt spinnable polyamide and a salt of an ether diamine and a dicarboxylic acid. U.S. Pat. No. 4,044,071 discloses a process for melt blending a molten-spinnable polyamide and a salt of an ether diamine and a dicarboxylic acid.

In the preceding prior art the polyamide portion of the copolymer is essentially a polyamide in that, for example, it contains no ether linkages, i.e., dioxa or oxa linkages. In contrast, the polyamide portion of the present composition does contain ether linkages.

U.S. Pat. No. 3,509,106 discloses the preparation of a random copolymer polycondensate of an adipic acid salt of ethylene-bis-(3-aminopropyl)ether and hexamethylene diammonium adipate (6,6 salt), the mole ratio of the former to the latter being for example in the range from 9:1 to 1:9. A function of the ether type additive is to enhance the moisture absorption of the resulting polycondensate compared to nylon 6,6 by itself. But this prior art does not disclose or suggest using the random polycondensate to form a block copolymer with a polyetheramide.

SUMMARY OF THE INVENTION

Present invention resides in a novel composition which is a block copolymer. The copolymer comprises blocks of a polyetheramide, e.g., a poly(dioxa-alkylamide), or poly(dioxa-arylamide) or poly(oxa-amide). The other component is a random copolymer which can result, but is not limited to, from a polycondensation of a precursor of the aforementioned polyetheramide and a precursor of an ether-free polyamide.

The addition of a relatively small amount of a precursor of a polyetheramide to a precursor of a polyamide results, after polymerization of the two, for example, in lowering the melting point of the latter without substantially modifying its other properties. It also facilitates its processing so that subsequent processing, e.g., melt blending, does not, in suitable amounts, adversely affect for the desired end use, its properties.

DESCRIPTION

The block copolymers of the invention comprise blocks of polyetheramide and blocks of random copolymer of (1) polyetheramide precursors and (2) precursors of ether-free polyamides. Typically, the block copolymers are prepared by polymerizing polyetheramide precursors to form polyetheramides; forming a mixture of polyetheramide precursors with precursors of ether-free polyamides, and polymerizing the mixture to form a random copolymer; and melt blending the polyetheramide and the random copolymer to form a block copolymer containing polyetheramide blocks and random copolymer blocks. The random copolymer has a lower melting point than a corresponding homopolymer of the ether-free polyamide.

The preferred composition of present invention is a block copolymer having the following repeating structural formula:

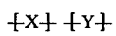

One of the components of the present invention, the —X— portion, is a polyetheramide having a repeating monomeric unit, which preferably is selected from the group having the following structural formulas:

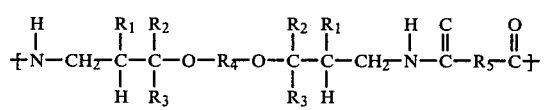

(A)

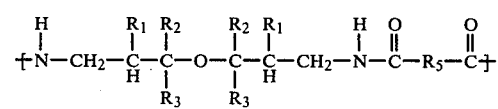

(B)

wherein $R_1$, $R_2$ and $R_3$ each are selected from the group consisting of H, $C_1$–$C_{10}$ alkyls, and $C_3$–$C_{10}$ isoalkyls and $R_4$ is selected from the group consisting of $C_1$–$C_{10}$ alkylenes and $C_3$–$C_{10}$ isoalkylenes and $R_5$ is selected from the group consisting of $C_0$–$C_{10}$ alkylenes, $C_3$–$C_{10}$ isoalkylenes, and $C_6$–$C_{20}$ arylenes. Preparations of the foregoing are disclosed in the following U.S. Pat. Nos.: 4,130,602 and 4,136,133; and U.S. Patent Application Ser. No. 773,740, filed Mar. 2, 1977; and the information contained therein is incorporated here by reference. Also disclosed in the patents are the preparations of precursors e.g., salts, used to make the foregoing polymers.

One of the precursor salts which can be used to make a particular polymer, belonging to the general class of polymers represented by (A), has the following structure:

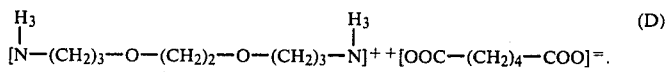 (D)

The foregoing can also be referred to as [30203]++[6]=. The numbers in brackets, e.g., 3, refers to the number of carbon atoms whereas "0" refers to the oxygen atom and indicates its relative location. When the foregoing salt is polymerized, it forms a polymer, also known as N-30203-6.

Examples of other polyetheramides whose precursors can be used include poly(4,7-dioxadecamethylene sebacamide), poly(4,9-dioxadodecamethylene adipamide), poly(4,8-dioxa-6,6-dimethylundecamethylene adipamide), poly(4,7-dioxa-2,9-dimethyldodecamethylene adipamide), poly(4,7-dioxadecamethylene-2-methyl adipamide), poly(4-oxaheptamethylene adipamide, and poly(4-oxa-2,6-dimethylmonomethylene adipamide).

The ─Y─ portion is a bivalent radical of a random copolymer containing two different monomeric units in which one is distributed randomly throughout the repeating structure. One of the two different monomeric units is a precursor of an ether-free polyamide whereas the other is a precursor of a polyetheramide which has been previously defined. The relative amount of the two is such that the amount of the polyetheramide precursor is sufficient to lower the melting point of the other polymeric unit, the polyamide, yet not so much as to adversely effect the desirable properties of the polyamide. Generally the amount of the polyetheramide precursor is present in the smaller amount whereas the other precursor is present in the larger amount. Preferred amounts of the etheramide in the ─Y─ portion are in the range between from about 3 wt.% to about 17 wt.% and a more preferred amount is in the range between from about 7 wt.% to about 13 wt.%.

The ─Y─ component of the present invention involves a precursor of a polyamide. Examples of such precursors include caprolactam (nylon 6), the hexamethylenediamine salt of adipic acid (nylon 6,6), and the hexamethylenediamine salt of terephthalic acid (nylon 6,T). Also the precursors for ether-free polyamides such as nylon 6, 10 [poly(hexamethylene sebacamide)], nylon 11 [poly(decamethylene carbonamide)], MXD-6 [poly(meta-xylene adipamide)]; PACM-9 [bis(-paraamino-cyclohexyl)-methane azelamide], PACM-10 [bis(paraaminocyclohexyl)methane sebacamide] and PACM-12 [bis(paraminocyclohexyl)methan dodecanoamide] can be used. Others are known to one skilled in the art, for example, see Kirk-Othmer, Encyclopedia of Chemical Technology, 2nd Edition, Volume 16, Polyamides. The structure of one of the precursors, a salt of the polyamide (nylon 6,6) involved in present inention, is as follows:

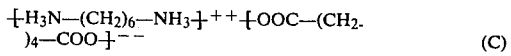 (C)

The foregoing can also be referred to as [6]++[6]--.

To prepare component ─Y─ generally a salt such as (C) is mixed with a salt such as (D) or other polyamide precursor. The resulting mixture is generally heated to a temperature above the melting point of the salts but not greater than any decomposition temperature. The mixture is maintained at that temperature and at atmospheric pressure or higher until some or all the polycondensation occurs. Often the mixture, during the polycondensation, is first subjected to pressure and then to a vacuum. The latter helps facilitate water removal. Pressure is often used to avoid the escape of volatile components, e.g., any diamine formed, which could adversely affect the resulting material. Actual temperature and pressure and time of blending depend on the particular materials used. The polyetheramide present in the ─X─ and ─Y─ portions of the block copolymer can be the same or different materials.

After the foregoing preparation the resulting random copolymer, using (C) and (D) as an example, could have the following structure:

The foregoing representation indicates that the (D) is randomly distributed throughout the copolymer which contains a larger amount of (C). The relative amount of (D) to (C) is such that the melting point of (E) is lower than that of the homo polymer formed by polycondensating the (C) salt by itself. However, the amount of (D) relative to (C) is not so much as to adversely affect the other properties that the homopolymer from (C) itself would have when incorporated into the final block copolymer. From a commercial standpoint the amount of (C) in the copolymer (C)-(D) is preferably between the range from about 3 wt.% to about 17 wt.%, more preferably from about 7 wt.% to about 13 wt.%.

The random copolymer, e.g., (E), is melt blended with a polyetheramide prepared, e.g., from salt (D). Thus two polymers, the polyetheramide and the random copolymer, are mixed together in a suitable manner. To melt blend the mixture the temperature of the mixture is raised to at least above the melting point of the lower melting point polymer but not greater than the decomposition temperature of either polymer and/or the product. The melt blending continues until sufficient transamidation occurs and the desired block copolymer is formed. In connection with the ongoing illustrative example, the block copolymer consists of the following structure:

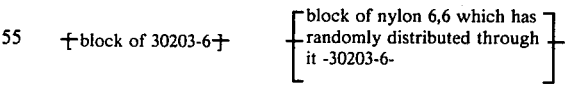

Transamidation refers to a known phenomenon whereby two molecules of the same or different polyamides both containing

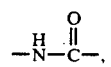

each breaks between the N and C bond and reform by attaching with the atoms in another molecule. Thus, pictorially:

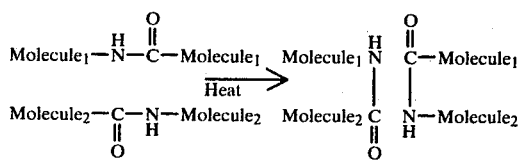

However, if the melt blending continues too long too much of the foregoing transamidation occurs and the block copolymer (e.g., molecules 1 and 2) tends to convert into a random copolymer.

Generally the molecular weight, either number average or weight average, of the block copolymer should be such that it is sufficient so that the polymer has physical properties suitable for the desired end use, e.g., fibers, molding and film. The molecular weight can vary over a wide range to meet the different requirements of the various and varied end uses. A typical molecular weight range for the block copolymer is between from about 5000 to about 100,000, either number average or weight average. Current commercial polyamides, e.g., both nylon 6, and nylon 6,6 have a number average molecular weight range of about 12,000–30,000.

The preferred composition of present invention has the following repeating structural formula $+X+_w+Y+_z$ wherein the subscripts w and z each have a value in the range between from about 4 to about 200. The aforementioned value refers to the number of repeating units contained in $+X+$ before a block of $+Y+$ is attached. The value 4, for example, represents a value in which some of the molecules could have less than 4 repeating units. Nevertheless, existing are a sufficient number of molecules having w and z with a value of more than 4 whereby overall the mixture has the properties as if each molecule had a w and z value of 4. Because of the demands of the market place, a preferred lower value of w and z would be about 6–8 whereas a higher preferred value would be about 125–175.

While the previous discussion focuses in on the preparation of the random copolymer via polycondensation of salts, other methods can be used to prepare the random copolymer. For example a polyetheramide and a polyamide (ether-free) can be melt blended for sufficient time and at a suitable temperature until a random copolymer results. And a random copolymer prepared by either method can be used to prepare applicants' block copolymer.

To further illustrate the invention, the following examples are provided.

EXAMPLES

The 1,2-bis(β-cyanoethoxyethane), i.e., NC—(CH$_2$)$_2$—O—(CH$_2$)$_2$—O—(CH$_2$)$_2$—CN; 4,7-dioxadecamethylenediamine i.e., NH$_2$(CH$_2$)$_3$—O—(CH$_2$)$_2$—O—(CH$_2$)$_3$—NH$_2$; and poly(4,7-dioxadecamethylene adipamide), can be prepared according to the procedure described in U.S. Pat. No. 4,130,602.

The N-30203-6 salt is prepared in the following manner. 204.4 gms of adipic acid (1.4 moles) are dissolved in 906 ml of methanol while 246.4 gms of 30203 diamine (1.4 moles) are dissolved in 906 ml of methanol. The adipic acid solution is added to the diamine solution and stirred under nitrogen. The resulting mixture is filtered and the recovered salt is air-dried overnight in the hood. Water is added to the dried recovered salt in an amount to make up a 60% salt solution. The solution is passed through a bed of charcoal to remove color bodies. To the decolorized solution is added sufficient diamine to adjust the pH of the solution to 7.45. The water is removed by vacuum and the salt is dried in a vacuum at 60° C. for 2 hours.

The other precursor, the N-6,6 salt is prepared by using the procedure just previously described except that the 30203 diamine is replaced by 162.4 gm of hexamethylene diamine.

The $+Y+$ component is prepared in the following manner. 104.3 gms of the N-6,6 salt are mixed with 11.3 gms of the N-30203-6 salt. Then 50 gms of the mixture are placed in a tube which is sealed and then heated at 190° C. for 2 hours. Then the tube is opened and heated at 222° C. under nitrogen (1 atmosphere) for ½ hour. The latter is then followed by heating at 275° C. under a vacuum for 2 hours. The $+Y+$ component has a composition of 90 wt.% of N-6,6 and 10 wt.% of N-30203-6 and exhibits the character of a random copolymer.

Demonstrating another method, samples of the $+Y+$ component were made by melt blending a mixture of the N-30203-6 polymer and nylon 6,6. The melt blending consisted of stirring at a temperature above the melting point of both of the polymers until additional stirring caused little change in the copolymer's melting temperatures obtained with a differential scanning calorimeter (DSC). This is shown in the accompanying Table. Thus the data indicates that melt blending a mixture of the polyetheramide N-30203-6 and nylon 6,6 for 360 minutes @283° C. produced a random copolymer. This conclusion was tested by preparing the copolymer by heating a mixture of the precursor salts of the 30203-6 polyetheramide and nylon 6-6 to form a copolymer which was tested as to its solubility in a formic acid. Its solubility was very similar, but not equivalent, to the solubility of the copolymer prepared by melt blending at the reported 360 minutes and 283° F. However, additional blending would have made the polymers equivalent as determined by the solubility test. Formic acid solubility test is one which is known for testing degrees of randomness.

TABLE

| MELTING POINTS OF VARIOUS POLYMERS | | | |
|---|---|---|---|
| | Melt Blending Time | DSC Temperatures | |
| Polymer | Minutes @ 283° C. | Onset | Peak |
| N 30203-6 | n.a. | 168° C. | 182° C. |
| Nylon 6,6 | n.a. | 247 | 263 |
| Block 70/30[a] | 15 | 244 | 258 |
| | 30 | 241 | 256 |
| | 60 | 236 | 252 |
| | 180 | 231 | 247 |
| Random 70/30 | 360 | 230 | 244 |

[a]70 wt. % of nylon 6,6, 30 wt. % of N-30203-6.

The $+X+$ component is prepared in the following manner. 50 gm of N-30203-6 are placed in a tube which is then sealed and heated for 2 hours at 190° C. The tube is opened and then heated for 222° C. for ½ hour under nitrogen which is then followed by heating at 222° C. under a vacuum for 2 hours.

The block copolymer of present invention is then prepared in the following manner. 100 gms of the dried $+Y+$ component, the random copolymer prepared by polycondensation of the salts, and 28.6 gms of the dried $+X+$ component are dry blended and heated at 255° C.–285° C. for about 15 minutes to about 2 hours to obtain the desired amount of transamidation. The resulting block copolymer has an overall composition of 70 wt.%/30 wt.% of N-6,6/N-30203-6. The melting point of the resulting block copolymer is about 225° C. and it can be melt spun at about 250° C. with essentially no further rearrangement occurring.

A random copolymer of 90 wt.% of nylon-6 and 10 wt.% of N-30203-6 was prepared and its melting point was 25° C. lower than that of nylon-6 (m.p. 220° C.). The random copolymer is then melt blended with a N-30203-6 polymer and the resulting block copolymer has a melting point lower than a similar block copolymer in which the nylon 6 portion is ether-free.

Use of other polyamides, polyetheramides and their precursors in the foregoing procedures will yield block copolymers having similar lowered melting points.

We claim:

1. A block copolymer comprising blocks of polyetheramide and blocks of a random copolymer of polyetheramide precursors and precursors of ether-free polyamide and wherein the block copolymer is free from ether-free polyamide block segments and the block copolymer has the following repeating structural formula

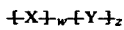

wherein $+X+$ is a polyetheramide selected from the group consisting of the following structural formulas:

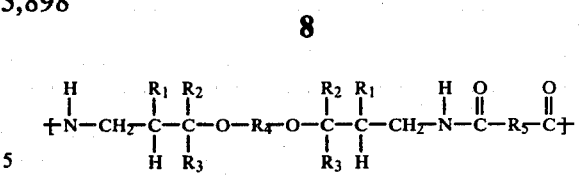

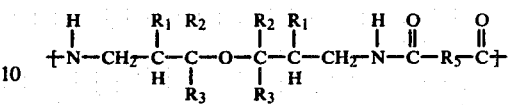

wherein $R_1$, $R_2$ and $R_3$ each are selected from the group consisting of H, $C_1$-$C_{10}$ alkyls and $C_3$-$C_{10}$ isoalkyls and $R_4$ is selected from the group consisting of $C_1$-$C_{10}$ alkylenes and $C_3$-$C_{10}$ isoalkylenes and $R_5$ is selected from the group consisting of $C_0$-$C_{10}$ alkylenes, $C_3$-$C_{10}$ isoalkylenes and $C_6$-$C_{20}$ arylenes and wherein $+Y+$ is a bivalent radical of a random copolymer containing an etheramide distributed randomly throughout a polyamide structure and wherein the amount of the etheramide contained in the polyamide structure is sufficient to form a copolymer having a lower melting point than a corresponding homopolymer of the polyamide and wherein w and z each have a value in the range between from about 4 to about 200.

2. A block copolymer according to claim 1 wherein the block copolymer $+X+$ $+Y+$ can be spun at a lower temperature than a block copolymer consisting of $+X+$ and a bivalent ether-free polyamide radical.

3. A block copolymer according to claim 1 wherein $+X+$ is poly(4,7-dioxadecamethylene) and $+Y+$ is a random copolymer of the precursors of poly(4,6-dioxadecamethylene) and nylon 6,6.

* * * * *

UNITED STATES PATENT OFFICE
CERTIFICATE OF CORRECTION

PATENT NO. : 4,273,898
DATED : June 16, 1981
INVENTOR(S) : Edward M. Kohn, Stephen L. Nickol, Robert M. Thompson It is certified that error appears in the above-identified patent and that said Letters Patent are hereby corrected as shown below:

column 4, line 37, change "(C)" to --(D)-- column 4, line 25, to right of structural formula, insert --(E)-- column 8, lines 32 and 35, after "methylene", insert --adipamide--

Signed and Sealed this

Fifth Day of July 1983

[SEAL]

Attest:

GERALD J. MOSSINGHOFF

Attesting Officer     Commissioner of Patents and Trademarks